United States Patent
Qiu et al.

(10) Patent No.: US 9,523,884 B2
(45) Date of Patent: Dec. 20, 2016

(54) DIRECT TYPE BACKLIGHT MODULE UNIT OF DUAL-SIDE LIQUID CRYSTAL DISPLAY DEVICE

(71) Applicant: Shenzhen China Star Optoelectronics Technology Co., Ltd., Shenzhen, Guangdong (CN)

(72) Inventors: Yongyuan Qiu, Guangdong (CN); Zanjia Su, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 85 days.

(21) Appl. No.: 14/374,541

(22) PCT Filed: Jun. 30, 2014

(86) PCT No.: PCT/CN2014/081276
§ 371 (c)(1),
(2) Date: Jul. 25, 2014

(87) PCT Pub. No.: WO2015/196498
PCT Pub. Date: Dec. 30, 2015

(65) Prior Publication Data
US 2015/0370129 A1 Dec. 24, 2015

(30) Foreign Application Priority Data
Jun. 24, 2014 (CN) .......................... 2014 1 0289783

(51) Int. Cl.
*G02F 1/1335* (2006.01)
*G02F 1/1333* (2006.01)

(52) U.S. Cl.
CPC ... *G02F 1/133603* (2013.01); *G02F 1/133608* (2013.01); *G02F 2001/133342* (2013.01); *G02F 2001/133607* (2013.01)

(58) Field of Classification Search
CPC .................... G02F 1/133602; G02F 1/133603
See application file for complete search history.

(56) References Cited

U.S. PATENT DOCUMENTS

2002/0064037 A1* 5/2002 Lee ................... G02F 1/133615
362/614
2008/0037279 A1* 2/2008 Chan ................. G02F 1/133603
362/612

(Continued)

FOREIGN PATENT DOCUMENTS

CN 102252217 A 11/2011
CN 203131615 U 8/2013

OTHER PUBLICATIONS

Translation of CN 102252217 Nov. 2011.*

*Primary Examiner* — Phu Vu
(74) *Attorney, Agent, or Firm* — Andrew C. Cheng

(57) ABSTRACT

A direct-type backlight module unit of the dual-side liquid crystal display comprising: a first display panel, a second display panel, a light source unit is formed between the first display panel and the second display panel; wherein the light source unit comprises a back-bezel including a first side opposite to the first display panel and a second side opposite to the second display panel and a through hole; the light source unit is a light bars made of a plurality of light units wherein a portion of the light bars bond into the first side so that the light units of the light bar is located in the through holes and lights the second display panel, and the other portion of the light bars bond into the second side so that the light units of the light bar is located in the through holes and lights the first display panel. Moreover, the back-bezel can be substituted by a LED light plate with through holes. It can reduce the thickness of the direct-type backlight module unit (Continued)

and the thickness of the dual-side LCD device in order to provide a batter user experience, simple structure and cost efficiency.

15 Claims, 3 Drawing Sheets

(56) References Cited

U.S. PATENT DOCUMENTS

| | | | |
|---|---|---|---|
| 2011/0228196 A1* | 9/2011 | Kubota | G02B 6/0021 349/62 |
| 2012/0081614 A1* | 4/2012 | Yamamoto | G02F 1/133603 348/725 |
| 2013/0148035 A1* | 6/2013 | Shimizu | G02F 1/133605 348/739 |

* cited by examiner

DIRECT TYPE BACKLIGHT MODULE UNIT OF DUAL-SIDE LIQUID CRYSTAL DISPLAY DEVICE

TECHNICAL FIELD

The present invention relates to the field of liquid crystal display, and particularly to a direct-type backlight module unit of dual-side liquid crystal display device.

DESCRIPTION OF RELATED ART

Liquid Crystal Display(LCD) is widely used in televisions, mobile phones, tablet computers and other information communication devices because of its high space efficiency, low power consumption, no radiation and low electromagnetic interference and other superior characteristics.

Liquid Crystal Display(LCD) is used in many different applications wherein the dual-side display has been recognized by consumers to be applied in some application fields. In general, the dual-side display is made of two LCD panels. However, the LCD Panel is not self-luminous by using the light from backlight module unit to display. The traditional concept is bonding two LCD monitors. However, this will increase the volume and the cost of materials that cannot achieve the benefit of LCD.

The LCD backlight module unit is divided into edge-type and direct-type. The edge-type LCD backlight module unit with a light guide plate (LGP) to mix and guide the light is the best choose for a dual-side display. The LGP (light guide plate) cost of direct-type backlight module unit can be omitted and has significant cost advantages compare to the edge-type LCD backlight module unit. However, the disadvantage of direct-type backlight module unit is too thicker to reduce the acceptability of consumers. When we use the direct-type backlight module unit in dual-side LCD display, the thickness of the dual-side display will increases because of the optical mixing distance (OD value) meanwhile increases the difficult of bonding the devices into the dual-side of PCB.

SUMMARY

Accordingly, the present invention provides a direct-type backlight module for a dual-side liquid crystal display device.

In order to achieve the above objective, the backlight module unit according to an exemplary embodiment of the present invention includes a first display panel, a second display panel, a light source unit is formed between the first display panel and the second display panel; wherein the light source unit comprises a back-bezel including a first side opposite to the first display panel and a second side opposite to the second display panel and a through hole; the light source unit is light bars made of a plurality of light units wherein a portion of the light bars bonding into the first side so that the light units of the light bar located in the through holes and lights the second display panel, and the other portion of the light bars bonding into the second side so that the light units of the light bar located in the through holes and lights the first display panel In an exemplary embodiment, the light bar is bonded with the first side and the second side of the back-bezel by a thermally conductive adhesive or snap structures in the bezel and the light bar.

In an exemplary embodiment, the through hole has an inclined wall that the opening area is larger than the bottom area of the through hole.

In an exemplary embodiment, the light units are light emitting diodes(LEDs) with scattering structure on the surface.

In an exemplary embodiment, the scattering structure is packaged second lens.

The present invention provides another direct-type backlight module for a dual-side liquid crystal display device includes a first display panel, a second display panel, a light source unit is a light plate comprising a first surface and second surface formed between the first display panel and the second display panel; wherein the first surface with a plurality of light emitting diodes(LEDs) or light bar lights the first display panel and a through hole, further comprising another light bar bonded into the first surface lights the second display panel through the through hole.

In an exemplary embodiment, the light bar is bonded with the first side and the second side of the back-bezel by a thermally conductive adhesive or a snap structure in the bezel and the light bar.

In an exemplary embodiment, the through hole has an inclined wall that the opening area is larger than the bottom area of the through hole.

In an exemplary embodiment, the light units are light emitting diodes(LEDs) with scattering structure on the surface.

In an exemplary embodiment, the scattering structure is packaged second lens.

Beneficial effects can be achieved by the present invention are that: reducing the thickness of the direct-type backlight module unit and the thickness of the dual-side LCD device to provide a batter user experience, simple structure and cost efficiency.

DETAILED DESCRIPTION OF EMBODIMENTS

The technical solutions of embodiments of the present invention will be clearly and fully described below with reference to the drawings of the embodiments of the present invention. Apparently, the described embodiments are merely part of embodiments of the present invention, but not all embodiments. Based on the described embodiments of the present invention, all the other embodiments obtained by those skilled in the art without creative effort are within the scope of protection of the present invention.

Figure 1:
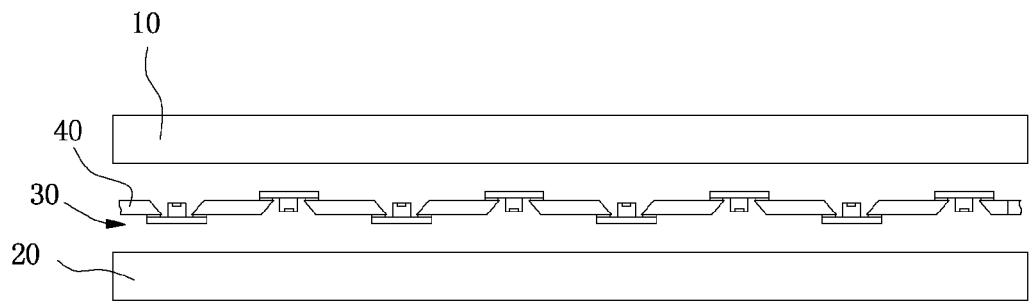
FIG. 1 is a structure schematic according to the first embodiment of the present invention.
Figure 2:
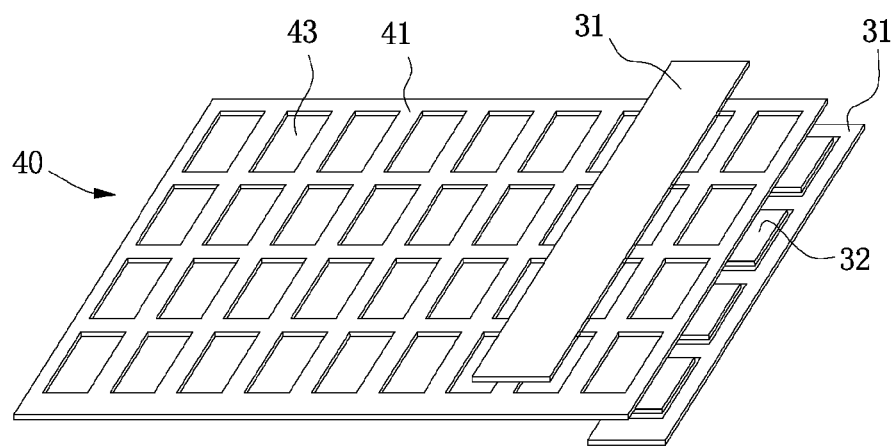
FIG. 2 is a structure schematic of back-bezel and light unit according to the first embodiment of the present invention.

Embodiment 1:

FIG. 1 is a structure schematic according to the first embodiment of the present invention. A direct-type backlight module of dual-side liquid crystal display device includes a first display panel 10, a second display panel 20, a light source unit 30 is formed between the first display panel 10 and the second display panel 20. Referring to FIG. 2, the light source unit 30 comprises a back-bezel 40 including a first side 41 opposite to the first display panel 10 and a second side 42 opposite to the second display panel 20 and a through hole 43. In this embodiment, the light source unit 30 is LED light bars 31 made of a plurality of LED light units, wherein a portion of the light bars 31 bond into the first side 41 so that the LED units 32 of the light bar 31 is located in the through holes 43 and lights the second display panel 20; the other portion of the light bars 31 bond into the second side 42 so that the LED units 32 of the light bar 31 is located in the through holes 43 and lights the first display panel 10.

Figure 3:
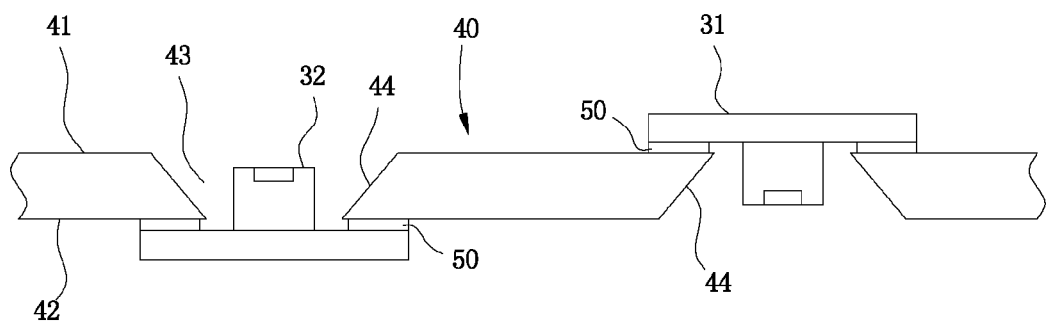
FIG. 3 is a cross-sectional view schematic of back-bezel and light unit according to the first embodiment of the present invention.

The light bar 31 are divided into two portions : lighting the first display panel 10 and lighting the second display panel 20 are spaced alternately for a lighting uniformity. Moreover, the light bar 31 is bonded with the first side 41 and the second side 42 of the back-bezel 40 by a thermally conductive adhesive. It can keep the distance between the first display panel 10 and the second display panel 20 to reduce the thickness of backlight module unit and the thickness of LCD. Referring to FIG. 3, the through hole 43 has an inclined wall 44 that the opening area is larger than the bottom area of the through hole 43 and the LED units 32 is embedded in the through holes 43.

Figure 4:
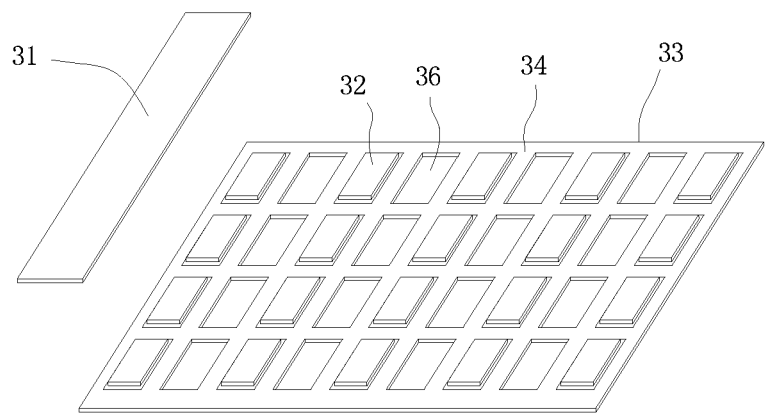
FIG. 4 is a light unit structure schematic according to the second embodiment of the present invention.
Figure 5:
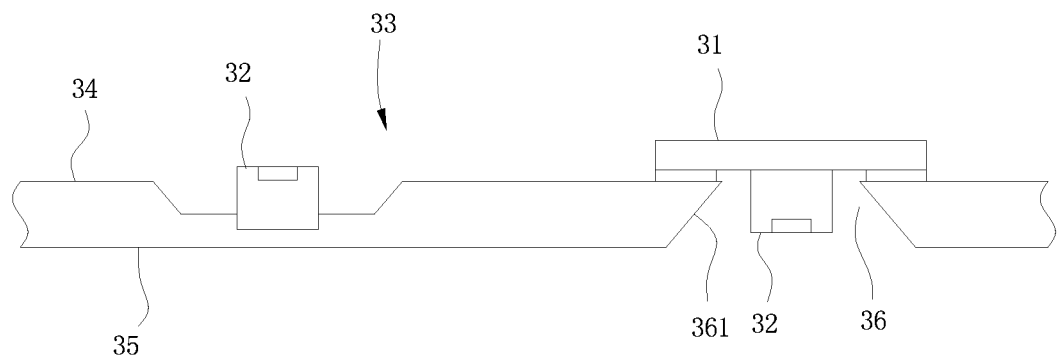
FIG. 5 is a cross-sectional view schematic according to the first embodiment of the present invention.

Embodiment 2:

Referring to FIG. 4 and FIG. 5, another direct-type backlight module unit of dual-side LCD device is provided. This embodiment of the present invention includes a first display panel 10, a second display panel 20, a light source unit 30 is formed between the first display panel 10 and the second display panel 20 (as the FIG. 1), wherein the light source unit 30 is a LED light plate 33 which comprises a first surface 34 with LED units 32 lighting the first display panel 10 and a second surface 35. Characterized in that the LED light plate 33 includes a through hole 36 with an inclined wall 361 and the light source unit 30 comprises a LED light bar 31 bonding into the first surface 34. This embodiment uses the LED light plate 33 to replace the back-bezel 40 of the first embodiment, it needs to improve the structure of the LED light plate 33 to achieve the object of the invention.

Figure 6:
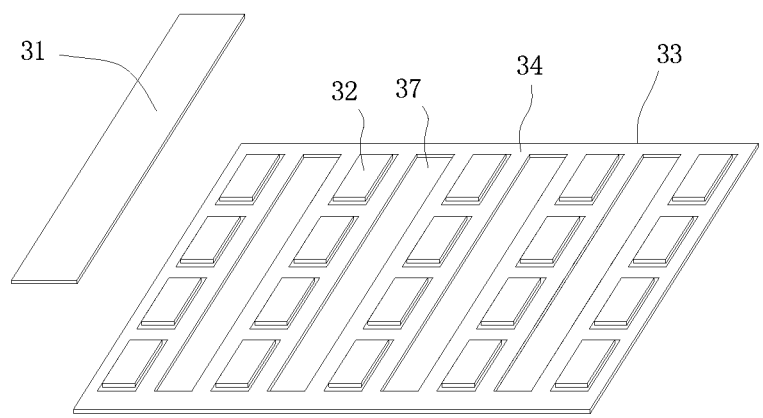
FIG. 6 is a light unit structure schematic according to the third embodiment of the present invention.
Figure 7:
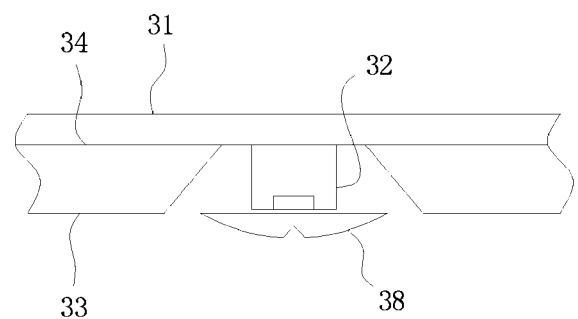
FIG. 7 is a schematic of a second lens in LED device according to the third embodiment of the present invention.
Figure 8:
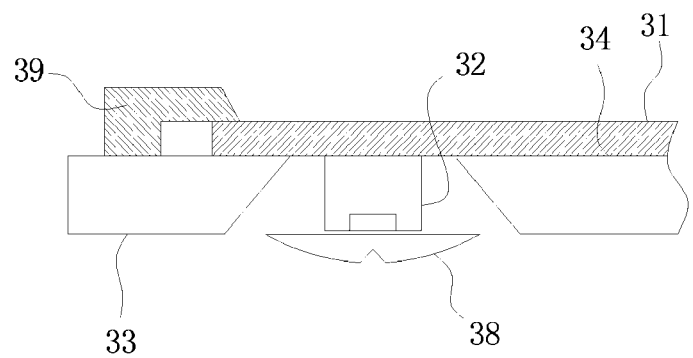
FIG. 8 is a schematic of a LED light bar and snap structure of back-bezel according to the third embodiment of the present invention.

Embodiment 3:

Referring to FIG. 6 and FIG. 7, the different between the embodiment 2 is the through hole of LED light plate 33 replaced by the strip-type hole 37 in the light source unit 30 and the LED light bar connected to the first surface 34 of the LED light plate 33. Moreover, the surface of the LED units 32 has a scattering structure which is a packaged second lens 38 to improve the lighting uniformity and the LED light bar 31 snap to the two edges of the LED light plate 33. Referring to FIG. 8, the LED light bar 31 is fixed by the snap structure 39 of the LED light plate 33.

Figure 9:
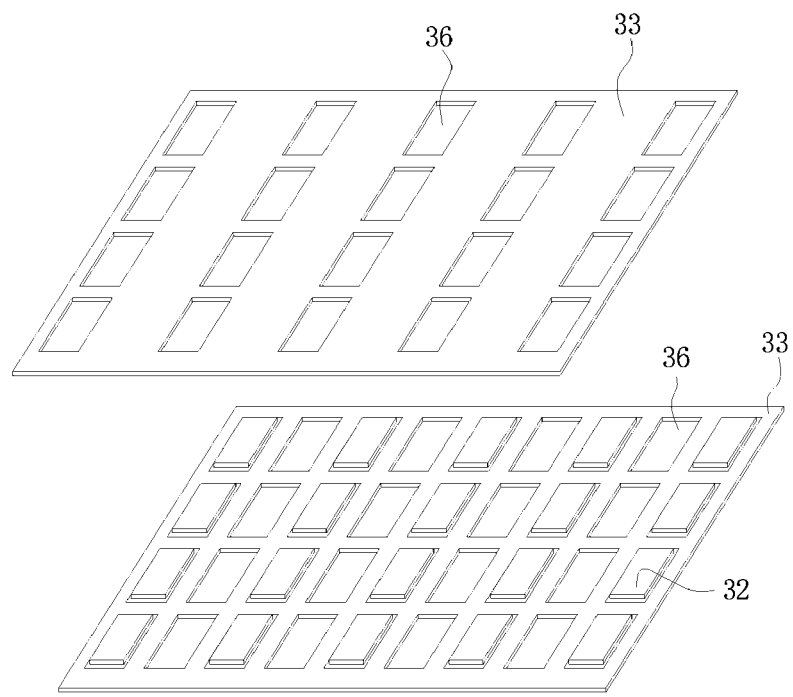
FIG. 9 is a light unit structure schematic according to the fourth embodiment of the present invention

Embodiment 4:

Referring to FIG. 9, the different between the above embodiment is the LED light bars are formed into a plate and the light source unit 30 is composed of two LED light plates 33 wherein the LED light units of the two LED light plates 33 is located in the through holes 36 or the strip-type through hole 37.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A direct-type backlight module unit of a dual-side liquid crystal display comprising: a first display panel, a second display panel, a light source unit is formed between the first display panel and the second display panel; wherein the light source unit comprises a back-bezel including a first side opposite to the first display panel and a second side opposite to the second display panel and a through hole; the light source unit is light bars made of a plurality of light units wherein a portion of the light bars bonding into the first side so that the light units of the light bar located in the through holes and lights the second display panel, and the other portion of the light bars bonding into the second side so that the light units of the light bar located in the through holes and lights the first display panel, wherein a first bar surface, which is opposite to the first display panel, of each of the portion of light bars is farther away from the second display panel than the first side be, and a second bar surface, which is opposite to the second display panel, of each of the other portion of the light bars is farther away from the first display panel than the second side be.

2. The direct-type backlight module unit of the dual-side liquid crystal display as claimed in claim 1, wherein the light bar is bonded with the first side and the second side of the back-bezel by a thermally conductive adhesive or a snap structure in the bezel and the light bar.

3. The direct-type backlight module unit of the dual-side liquid crystal display as claimed in claim 1, wherein the through hole has an inclined wall that the opening area is larger than the bottom area of the through hole.

4. The direct-type backlight module unit of the dual-side liquid crystal display as claimed in claim 1, wherein the light source units are light emitting diodes(LEDs) with scattering structure on a surface of each of the light emitting diodes.

5. The direct-type backlight module unit of the dual-side liquid crystal display as claimed in claim 2, wherein the light source units are light emitting diodes(LEDs) with scattering structure on a surface of each of the light emitting diodes.

6. The direct-type backlight module unit of the dual-side liquid crystal display as claimed in claim 3, wherein the light source units are light emitting diodes(LEDs) with scattering structure on a surface of each of the light emitting diodes.

7. The direct-type backlight module unit of the dual-side liquid crystal display as claimed in claim 4, wherein the scattering structure is packaged second lens.

8. The direct-type backlight module unit of the dual-side liquid crystal display as claimed in claim 5, wherein the scattering structure is packaged second lens.

9. The direct-type backlight module unit of the dual-side liquid crystal display as claimed in claim 6, wherein the scattering structure is packaged second lens.

10. A direct-type backlight module unit of a dual-side liquid crystal display comprising: a first display panel, a second display panel, a light source unit is a light plate comprising a first surface and second surface formed between the first display panel and the second display panel; wherein the first surface with a plurality of light emitting diodes(LEDs) or light bar lights the first display panel and a through hole, further comprising another light bar bonded into the first surface lights the second display panel through the through hole, wherein a bar surface, which is opposite to the first display panel, of the another light bar bonded into the first surface is farther away from the second display panel than the first surface be.

11. The direct-type backlight module unit of the dual-side liquid crystal display as claimed in claim 10, wherein the light bar is bonded with two sides of the light plate by a thermally conductive adhesive or a snap structure in the light plate and the light bar.

12. The direct-type backlight module unit of the dual-side liquid crystal display as claimed in claim 10, wherein the light source units are light emitting diodes(LEDs) with scattering structure on a surface of each of the light emitting diodes.

13. The direct-type backlight module unit of the dual-side liquid crystal display as claimed in claim 11, wherein the light source units are light emitting diodes(LEDs) with scattering structure on a surface of each of the light emitting diodes.

14. The direct-type backlight module unit of the dual-side liquid crystal display as claimed in claim 12, wherein the scattering structure is packaged second lens.

15. The direct-type backlight module unit of the dual-side liquid crystal display as claimed in claim 13, wherein the scattering structure is packaged second lens.

\* \* \* \* \*